United States Patent [19]
Washburn

[11] 3,854,882
[45] Dec. 17, 1974

[54] CONTROL SYSTEM IN AN APPARATUS FOR REACTING SILICON WITH NITROGEN

[75] Inventor: Malcolm E. Washburn, Princeton, Mass.

[73] Assignee: Norton Company, Worcester, Mass.

[22] Filed: Jan. 17, 1973

[21] Appl. No.: 324,368

[52] U.S. Cl. ............... 23/253 A, 236/15 C, 432/47
[51] Int. Cl. ........................ F23n 5/18, G05d 27/00
[58] Field of Search ..... 23/230 A, 253 A; 236/15 C; 432/47; 137/12, 14; 423/325; 106/55

[56] References Cited
UNITED STATES PATENTS

| | | | |
|---|---|---|---|
| 2,886,616 | 5/1959 | Mertz et al. | 23/230 A |
| 3,539,165 | 11/1970 | Ingels | 432/47 |
| 3,639,101 | 2/1972 | Washburn | 106/55 X |

*Primary Examiner*—Morris O. Wolk
*Assistant Examiner*—Timothy W. Hagan
*Attorney, Agent, or Firm*—Oliver W. Hayes

[57] ABSTRACT

Apparatus for nitriding silicon with means for controlling the flow of nitrogen into a reaction chamber as a function of the pressure in the chamber. The rate of flow of nitrogen is also measured, this being a measure of the reaction rate, and is used as a means for controlling the operation of the apparatus. When this nitrogen flow rate reaches a predetermined amount the apparatus provides for flooding the reaction chamber with an inert gas for a predetermined set period. The automatic on and off cycling of inert gas and nitrogen provides high yields of nitrided product while preventing run away reaction.

2 Claims, 1 Drawing Figure

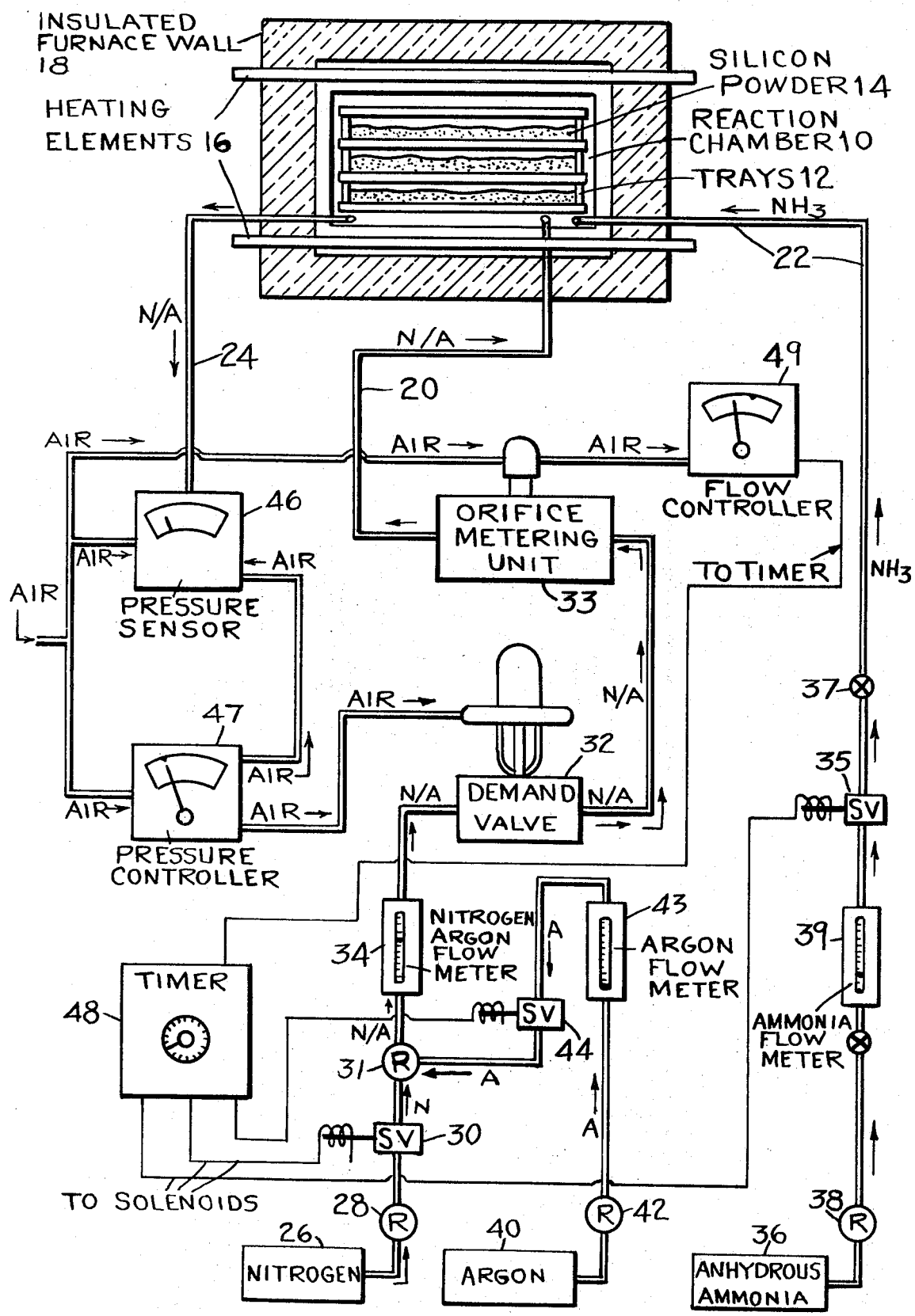

CONTROL SYSTEM IN AN APPARATUS FOR REACTING SILICON WITH NITROGEN

This application is directed to an improvement in nitriding apparatus which is described but not claimed in my prior U.S. Pat. No. 3,639,101 issued Feb. 1, 1972.

U.S. Pat. No. 3,356,513 on the production of silicon oxynitride teaches that silicon oxynitride can be made by mixing finely divided silicon metal with finely divided silica in various ratios of 47.5 to 98 parts of silicon to 1 to 50 parts of silica, adding a promoter such as an alkaline earth oxide, and firing in an atmosphere of nitrogen and oxygen in which the ratio by volume of oxygen to nitrogen is in the range of 1 to 6 parts oxygen to 99 to 94 parts nitrogen.

The reaction that takes place is essentially as follows:

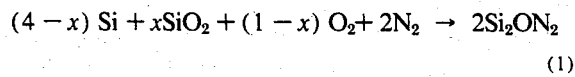

$$(4-x)\,Si + xSiO_2 + (1-x)\,O_2 + 2N_2 \rightarrow 2Si_2ON_2 \quad (1)$$

where $x$ varies between 0 and 1 and is the number of moles of $SiO_2$ which are converted to $Si_2ON_2$. The value of $x$ is dependent in many factors including composition, particle size, availability of $O_2$, temperature, homogeneity, etc.

This reaction is exothermic. Heat generated internally in a large mass can raise the temperature of the mass above the melting point of silicon, which in turn drastically reduces the rate of reaction. I have found that rapid temperature rise from an uncontrolled exothermic reaction also results in excessive growth, and causes bad swelling and cracking to occur in molded products. Such product is very weak and can even be crumbly in severe cases.

A similar exothermic reaction is involved in the production of silicon nitride as described in patent to Lumbey U.S. Pat. No. 3,591,337 issued July 6, 1971.

I have discovered that these exothermic reactions can be controlled by replacing the nitrogen and oxygen by an inert gas such as helium or argon for short intervals of time in the reaction chamber and then admit a relatively small quantity of gaseous reactants back into the chamber, thereby allowing only a small amount of reaction to proceed during the critical phases of the reaction. The amount of inert gas required to suffocate the reaction is small, and enough to fill the reaction chamber is all that is needed to stop the reaction. During the period of suffocation, the inert gas performs two functions. First, it restricts the quantity of available gaseous reactants and second, it lowers the temperature at the reaction site where a particle of silicon is in intimate contact with a particle of silica. To allow the reaction to resume, the gaseous reactants may be administered slowly, partially replacing the inert gas which may be leaked off through an outlet in the chamber. In this manner, the reaction may proceed only to the extent allowed by the amount of gaseous reactant that is available. This amount is equal to the partial pressure of the gaseous reactant.

I have found that both helium and argon can be used as the inert gas to control the partial pressures of the gaseous reactants. A partial vacuum can also be used to restrict the availability of the gaseous reactants as well, but a vacuum-tight system is required. The preferred gas is argon. Argon, because of its larger atomic size, has a greater suffocating effect and larger heat capacity on a volume basis. The mean free path of contaminating gases through accidental leakage in the reaction chamber is shorter with argon than with helium or a vacuum. All three methods of partial pressure control or combinations of them can be used, however, if proper precaution against leakage is taken. Examples are given for an on-off type of operation, i.e., a complete replacement of the gaseous reactants by inert gas followed by a complete replacement of the reactants. During the interval of injection of reactant back into inert gas, however, the reaction has been found in practice to proceed smoothly at a controlled low level with a mixture of the two gases until complete replacement is achieved. Thus, the reaction can be controlled by maintaining a proportional mixture of reactant and inert gas with controlled leakage and constant pressure, thereby, resulting in a more constant rate of reaction.

In practice, I have found that the rate of flow of nitrogen into the chamber is a direct indication of the rate at which the reaction is taking place. If the weight of green product is known, then the nitrogen required can be calculated. According to reaction (1), theoretically complete reaction will result in a 39 percent weight gain (ignoring $O_2$ reaction). For the formation of silicon nitride ($Si_3N_4$ or $Si_{11.5}N_{15}O_{0.5}$) the weight gain is equal to about 63–67.5 percent of the silicon starting material. The handbook value for the weight of nitrogen shows that, at standard conditions, nitrogen weighs 0.078 lb./cu.ft. The flow rate of nitrogen can be calculated as the weight and also as the percent required for theoretical completion. This value is referred to as the rate of reaction.

Leakage of the chamber can be determined before the reaction starts and this can be subtracted from the flow rate to determine the actual nitrogen consumption.

The speed at which the reaction is proceeding can be determined by the slope of the nitrogen input curve and can be determined as the change in rate of reaction as percent/hour/hour. This value can be used to judge when the reaction is proceeding too fast and may be used to control the reaction. Conventional automatic control equipment, sensing the change in nitrogen flow can be employed for automatic control of the reaction.

The best control, however, is the rate of reaction as determined by the flow rate. By allowing the rate to increase to a maximum point and then controlling the partial pressure by adding argon, for example, the exothermic effects can be brought under control easily. This can be repeated as many times as necessary until the reaction rate has stabilized.

Apparatus for practicing the above process and which is the subject matter of the present invention is illustrated in FIG. 1 which is a schematic diagrammatic representation of one preferred embodiment. This apparatus comprises a reaction chamber 10 containing a number of trays 12 each of which supports a thin layer 14 of powdered silicon to be reacted at a temperature below its melting point. When silicon oxynitride is to be the product of the reaction the finely powdered silicon preferably also contains silicon dioxide. Surrounding the reaction chamber 10 is a series of heating elements 16 which in turn are surrounded by the outer insulated furnace wall 18. The walls of the reaction chamber are preferably slabs of silicon carbide reasonably tightly sealed by silicon carbide refractory cement.

Leading into the reaction chamber are three pipes, 20, 22 and 24. Pipe 20 is for introduction of nitrogen or argon, pipe 22 is for the introduction of ammonia and pipe 24 permits measurement of the internal gas pressure within the reaction chamber 10. A slight leakage of gas from the interior of the reaction chamber 10 is provided, this being on the order of 5 to 30 cubic feet per hour depending upon the size of the chamber. Nitrogen is supplied to the reaction chamber from a source 26 thereof, the nitrogen being fed through a pressure regulator 28 which reduces the pressure to about 20 psi gage. Nitrogen then passes through a solenoid controlled valve 30, through a regulator 31, through a flow meter 34, then through demand valve 32, through an air actuated orifice metering unit 33 and into the pipe 20 for introduction into the reaction chamber. Ammonia from a supply 36 passes through a pressure regulator 38, through flow meter 39 and solenoid valve 35, then through needle valve 37 and into the pipe 22. The pressure regulator 38 and needle valve 37 are arranged to provide about 1 to 5 cubic feet per hour of ammonia feed to the reaction chamber 10. Argon from a supply 40 passes through a pressure regulator 42, through flow meter 43, then through a solenoid valve 44 and into the nitrogen system at regulator 31.

A pressure senser 46 is connected by means of the pipe 24 to the reaction chamber 10. This pressure senser 46 is arranged to provide a signal to the demand valve 32 through pressure controller 47 whenever the pressure within the reaction chamber falls below a preset pressure, such as .05 inches of water, thereby opening the demand valve 32 and permitting flow of nitrogen into the reaction chamber. The orifice metering unit 33 is arranged to provide a signal to flow controller 49 and timer circuit 48 when a preset flow rate of nitrogen is achieved in the orifice metering unit 33. When this rate is reached controller 49 and timer 48 are activated to open the solenoid valve 44, permitting argon flow, and to close the solenoid valve 30, cutting off the nitrogen flow. Solenoid 35 is also activated, cutting off ammonia flow. At the end of a predetermined time, such as 10 minutes, the timer reopens the nitrogen solenoid valve 30, closes the argon solenoid valve 44 and opens ammonia solenoid valve 35. Nitrogen and ammonia again flow into the reaction chamber 10 until the reaction rate increases to the point where the signal from orifice metering unit 33 activates the flow controller 49 so that it reaches its preset point which then again causes the controller 49 and timer 48 to stop nitrogen and ammonia flow and commence the argon flow. This cycling continues until the reaction rate no longer increases to the point where the orifice metering unit 33 will activate the control 49 and timer 48. At this point the timer can, by means not shown, provide for an increase in the furnace temperature to permit completion of the reaction since the danger of exothermic run away of the reaction has now passed.

In one preferred embodiment of the invention the apparatus is designed for converting 133 pounds of silicon into alpha silicon nitride. Sixteen trays approximately 15 inch by 15 inch are mounted in the reaction chamber and each tray contains approximately 8 pounds of finely divided silicon powder spread out in the tray to a thickness of approximately 1 inch. The reaction chamber has a volume of approximately 30 cubic feet and the heaters are arranged to heat the chamber to a temperature of approximately 1,300°C. The chamber 10 has an out flow of gas of approximately 20 cubic feet per hour. The ammonia pressure regulator valve 38 is adjusted to provide a flow of 5 cubic feet per hour and the nitrogen pressure regulator 31 is arranged to provide a pressure of approximately 10 psi feeding into the demand valve 32. The demand valve 32 opens proportionally as nitrogen is consumed whenever the pressure inside of the reaction chamber 10 tends to be less than 0.05 inches of water, maintaining a constant pressure in the reaction chamber 10. The orifice metering unit 33 is arranged (through controller 49) to turn off the nitrogen flow and start the timer 48 when the nitrogen flow reaches a rate of 65 cubic feet per hour. On the basis of the initial charge of silicon in the reaction chamber this nitrogen flow is equivalent to approximately 3 percent reaction per hour. The timer 48 is set to maintain the solenoid 44 open and the solenoid 30 closed for 10 minutes. The pressure regulator 42 is arranged to provide a pressure of 10 psi of argon down stream of the regulator for feeding into the reaction chamber 10 when the valve 44 is open.

While the invention has been particularly described in connection with apparatus for the production of $Si_3N_4$ and $Si_2ON_2$ this apparatus can also be used to produce $Si_3N_4$ bonded SiC and similar operations involving the exothermic reaction between silicon and nitrogen. Where the $Si_3N_4$ is used as a bond, for example, a shaped piece of SiC containing silicon powder may be placed in the apparatus and the silicon can be converted to $Si_3N_4$ or $Si_2ON_2$ by reaction with nitrogen (with or without oxygen).

What is claimed is:

1. In an apparatus for reacting silicon with nitrogen at elevated temperature in a heated reaction chamber, which includes a source of inert gas, a conduit for introducing inert gas into the reaction chamber, a first valve means in said inert gas conduit, a nitrogen source, a conduit for introducing said nitrogen into the reaction chamber, and a second valve means in said nitrogen conduit for controlling the flow of nitrogen into said reaction chamber, the improvement which comprises means for controlling said second valve means as a function of the pressure in the reaction chamber, means for measuring the rate of flow of nitrogen through the conduit and into the chamber, a timing means, and means responsive to a predetermined rate of nitrogen flow into said reaction chamber:
   a. to actuate the second valve means to reduce the flow of nitrogen to the reaction chamber,
   b. to actuate the first valve means to introduce inert gas into the reaction chamber, and
   c. to actuate said timing means, said timing means being effective after a predetermined interval, to reopen the second valve means and to close the first valve means to reduce the flow of inert gas.

2. The apparatus of claim 1 wherein said second valve means includes two valves in series, one of said valves being controlled as a function of pressure in the chamber and the other being controlled as a function of rate of nitrogen flow.

* * * * *